(12) United States Patent
Bugge (10) Patent No.: US 7,584,839 B2
(45) Date of Patent: Sep. 8, 2009

(54) MULTIPURPOSE LINEAR GUIDE

(76) Inventor: Niels Bugge, Vestfjordveien 61, N-3142 Vestskogen (NO)

( * ) Notice: Subject to any disclaimer, the term of this patent is extended or adjusted under 35 U.S.C. 154(b) by 46 days.

(21) Appl. No.: 12/064,204

(22) PCT Filed: Aug. 17, 2006

(86) PCT No.: PCT/NO2006/000297

§ 371 (c)(1),
(2), (4) Date: Mar. 3, 2008

(87) PCT Pub. No.: WO2007/021197

PCT Pub. Date: Feb. 22, 2007

(65) Prior Publication Data

US 2008/0223696 A1 Sep. 18, 2008

(30) Foreign Application Priority Data

Aug. 19, 2005 (NO) .................... 20053900

(51) Int. Cl.
*F16H 19/06* (2006.01)
*B65G 23/44* (2006.01)
*B65G 15/62* (2006.01)

(52) U.S. Cl. .................... 198/814; 198/841; 74/89.2

(58) Field of Classification Search ................ 198/814, 198/837, 838, 841; 74/89.2
See application file for complete search history.

(56) References Cited

U.S. PATENT DOCUMENTS

| 452,191 | A | * | 5/1891 | Oliver | 198/814 |
|---|---|---|---|---|---|
| 2,677,456 | A | * | 5/1954 | McCann | 198/814 |
| 3,718,197 | A | * | 2/1973 | Barten et al. | 177/16 |
| 3,773,166 | A | * | 11/1973 | Nowacki | 198/493 |
| 4,852,465 | A | | 8/1989 | Rosengren | |
| 4,993,542 | A | * | 2/1991 | Nomura | 198/816 |
| 5,082,108 | A | * | 1/1992 | Douglas | 198/836.4 |
| 5,119,925 | A | * | 6/1992 | Nomura et al. | 198/814 |
| 5,156,260 | A | * | 10/1992 | Dorner et al. | 198/813 |
| 5,303,638 | A | | 4/1994 | Green | |
| 5,307,920 | A | * | 5/1994 | Meyer et al. | 198/335 |
| 6,170,645 | B1 | | 1/2001 | Mitchell | |

(Continued)

FOREIGN PATENT DOCUMENTS

DE  35 13 384 A1  11/1986

(Continued)

OTHER PUBLICATIONS

International Search Report for corresponding International Application No. PCT/NO2006/000297 dated Mar. 8, 2007.

(Continued)

*Primary Examiner*—Mark A Deuble
(74) *Attorney, Agent, or Firm*—Heslin Rothenberg Farley & Mesiti P.C.; Victor A. Cardona (57) ABSTRACT

A linear band guide device for supporting and defining a path for a band includes an elongate band support element, a first band end support at a first end of said elongate band support element, a second band end support at a second end of said elongate band support element. The elongate band support element has a substantially flat top surface capable of functioning as a slide bed for the band.

20 Claims, 9 Drawing Sheets

U.S. PATENT DOCUMENTS

| | | |
|---|---|---|
| 6,422,382 B1 | 7/2002 | Ertel et al. |
| 6,435,719 B1 | 8/2002 | Riedel et al. |
| 7,232,029 B1 * | 6/2007 | Benedict et al. ............. 198/817 |

FOREIGN PATENT DOCUMENTS

| | | |
|---|---|---|
| DE | 85 29 524.8 U1 | 2/1987 |
| DE | 38 39 091 A1 | 5/1990 |
| DE | 38 39 091 B4 | 5/1990 |
| DE | 43 34 611 A1 | 4/1994 |
| DE | 20 2004 014 821 U1 | 12/2004 |
| DE | 103 43 569 A1 | 4/2005 |
| EP | 0 332 299 A1 | 9/1989 |
| EP | 1 184 306 A2 | 3/2002 |
| EP | 0 828 083 B1 | 1/2003 |
| EP | 1 184 306 A3 | 2/2004 |
| GB | 2 183 584 A | 6/1987 |
| GB | 2 333 274 A | 7/1999 |
| JP | 09-296824 | 11/1997 |

OTHER PUBLICATIONS

International Preliminary Report on Patentability for corresponding International Application No. PCT/NO2006/00297 dated Sep. 26, 2007.

Norwegian Search report for Priority Application No. 2005 3900.

* cited by examiner

MULTIPURPOSE LINEAR GUIDE

CROSS REFERENCE TO RELATED APPLICATIONS

This application is a national stage of PCT International Application No. PCT/NO2006/000297, filed on Aug. 17, 2006, and published in English on Feb. 22, 2007, as International Publication No. WO 2007/021197 A2, which claims priority to Norwegian application No. 2005-3900 filed on Aug. 19, 2005, the entire disclosures of which are incorporated herein by reference.

BACKGROUND OF THE INVENTION

1. Field of the Invention

The present invention is related to linear guides in general and in particular to a multi-purpose linear band-based guide device configurable both as a traditional linear guide device and as a narrow band conveyor device.

2. Description of Related Art

Linear guides are useful in a machine tool as well as in industrial machines. Conventionally, a guide bearing apparatus comprises a guide rail, a slider or carriage serving as a movable elements and a plurality of balls serving as rolling elements. The balls may be arranged in ball bearing arrangements.

The ball bearing arrangements are used to move the slider or carriage along the guide rail. Typically, the balls are disposed in a circulation passage which composed of a first set of raceway grooves formed in the rail structure and a second set of raceway grooves form a circulation passage for the balls in the main body of the slider or carriage.

In the related art section of U.S. Pat. No. 6,902,322 B2 it is explained how dust may be prevented from entering a ball circulation passage by disposing seals for sealing the side walls of the guide rail and the inner walls of the movable element. Further, U.S. Pat. No. 6,902,322 B2 details improvements to such seals in order to improve flexion of the seals and reduce the risk of poor sealing conditions. This patent highlights the importance of using sealing structures to protect the ball bearing arrangements in linear guides.

Many environments are, however, inherently relatively dirty and inevitably will expose a linear guide to a number of substances which might fill a ball bearing arrangement thereby clogging the ball circulation paths. This invariably leads to a requirement for cleaning at regular intervals or to a complete blockage and a non-functioning sliding function.

Ball-bearing arrangements provide superior sliding operation when clean and manufactured to tight tolerances, but on the other hand, they are expensive and complicated elements which are susceptible to clogging by dust and the other substances in its environment.

OBJECT OF THE INVENTION

The present invention aims to reduce the above limitations of conventional linear guide apparatus. Accordingly, it is an object of this invention to provide a linear guide which has reduced likelihood of suffering from reduced functionality due to clogging and deposition of dirt. It is a second object of this invention to provide a linear guide which may easily be taken apart for cleaning and replacement of non-functioning parts. Further, it is an object of the present invention to provide a linear guide which is suitable for use in rough environments. Finally, it is an additional object of the invention to provide a new linear guide arrangement which has improved functionality in being modular, reconfigurable, reusable, scaleable, and/or transformable in as many aspects as possible.

SUMMARY OF THE INVENTION

According to the invention, there is provided a linear band guide device for supporting and defining a path for a band. The linear band guide has an elongate band support element, a first band end support at a first end of said elongate band support element, and a second band end support at a second end of said elongate band support element. The elongate band support element has a substantially flat top surface capable of functioning as a slide bed for the band.

In one alternative preferred embodiment of the linear guide according to the invention the substantially flat top surface of the elongate band support element has band guiding means in order that a band may be guided along a predetermined path along said beam top surface.

In one version of the preferred embodiment of the linear guide according the invention with band guiding means, the band guiding means is a groove in said top surface oriented in the longitudinal direction of said elongate band support element for allocating a complementary longitudinally oriented protruding rib of a band.

In yet a preferred embodiment of the linear band guide device according to the invention, the elongate band support element comprises a first side wall and a second side wall. Each of the said side walls has a guiding track for guiding a slider. The slider has complementary guiding tracks.

In a further preferred embodiment of the linear band guide device according to the invention a guiding track in a wall for a slider or carriage is a single groove of substantially rectangular cross section.

In yet a further preferred embodiment of the linear band guide device according to the invention a guiding track comprise a groove located near the top surface of the elongate band support structure.

In a still further preferred embodiment of the linear band guide according to the invention a guiding track comprise a groove located near the bottom surface of the elongate band support structure.

In yet a preferable embodiment of the linear band guide according to the invention an elongate band support having a first side wall and a second side wall, each of the said side walls having a generally elongated, cylindrically formed guiding track for at least partly allocating a generally elongated, cylindrically formed intermediate element arranged in said support element guiding track. The intermediate element is arranged for contacting complementary guiding tracks of a slider or carriage.

In an alternative embodiment of the linear band guide using intermediate elements a slider or carriage comprises a tightening screw, arrange to allow for tightening the coupling between said carriage and said band support element.

In a yet further preferred embodiment of the linear band guide device according to the invention the elongate band support element comprises one or more connected centre elements, a first connecting element at a first end of said one or more connected centre elements for connecting the centre elements to said first band end support, and a second connecting element for connecting the centre elements to said second band end support.

In a still preferred embodiment of the linear band guide device according to the invention a continuous band is arranged to move in an endless elongate loop passing a first band end support and a second band end support, the end supports being arranged at opposite ends of the elongate band support structure.

In a yet still preferred embodiment of the linear band guide according to the invention a slider or carriage is attached to the band and the carriage is guided in its movement by tracks.

In yet a further preferred embodiment of the linear band guide device according to the invention a first band end support is arranged to turn the direction of travel of the band from a first direction to a second direction, a second band end support is arranged to turn the direction of travel of the band from the second direction to the first direction, and one of the first and second band end supports has band drive means and band engaging means whereby said band drive means may provide the band with a movement along said band path.

In a preferred embodiment of the linear guide device according to the invention a first direction of travel of the band is adjacent and parallel with the top surface of the band end support.

In a still preferred embodiment of the linear band guide device according to the invention a second direction of travel of the band is adjacent and parallel with the bottom surface of the band end support.

In a yet a further still preferred embodiment of the linear band guide according to the invention one or more auxiliary brackets allows for the mounting of the linear band guide device onto a leg/support element and/or for supporting a guiding structure.

In a yet another further still preferred embodiment of the linear band guide device according to the invention each auxiliary bracket is fastened to a connecting element.

DETAILED DESCRIPTION OF THE INVENTION

Figure 1A:
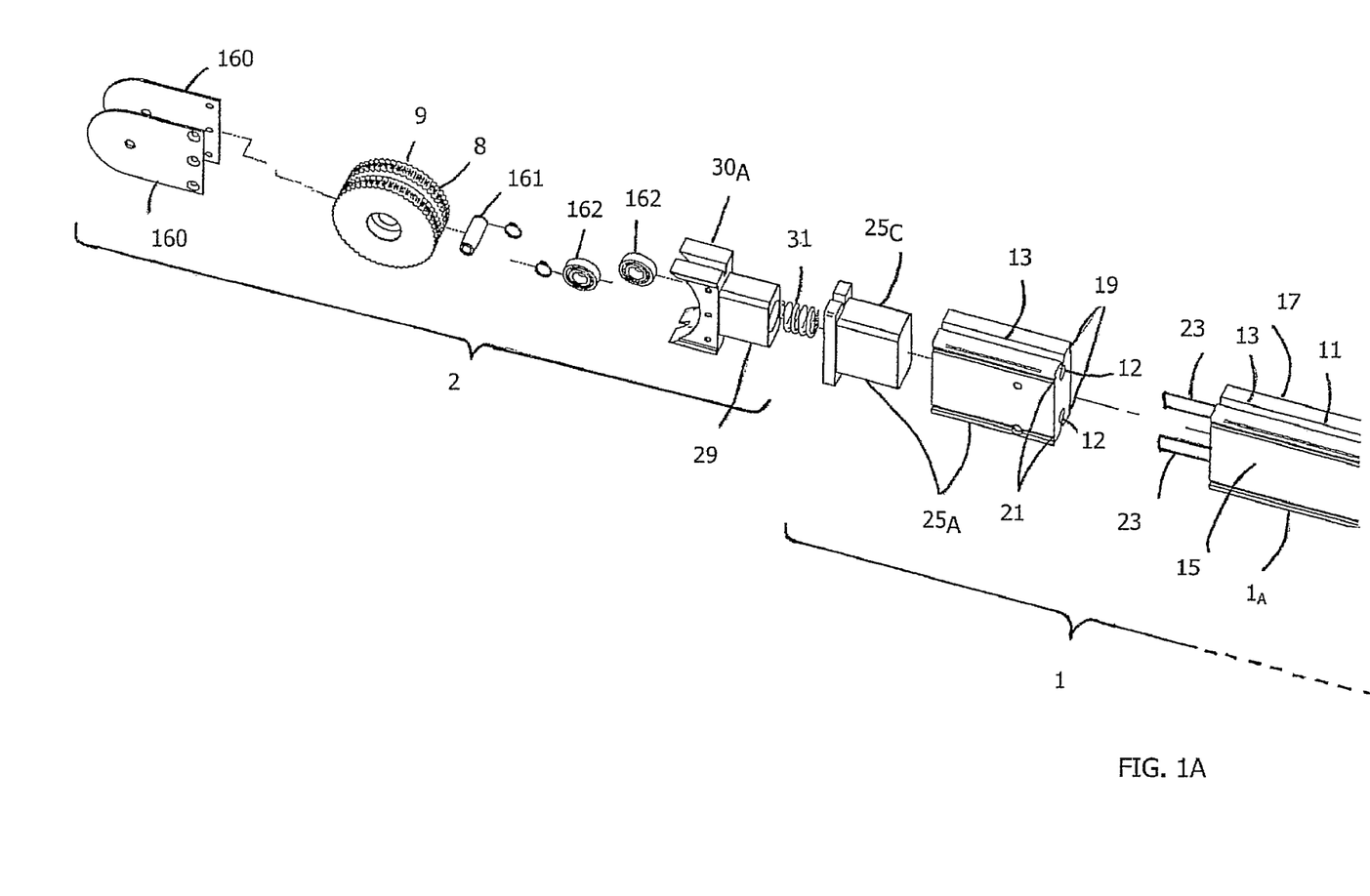
FIG. 1A is an exploded view of a first end of an example embodiment of a linear band guide device according to the present invention.
Figure 1B:
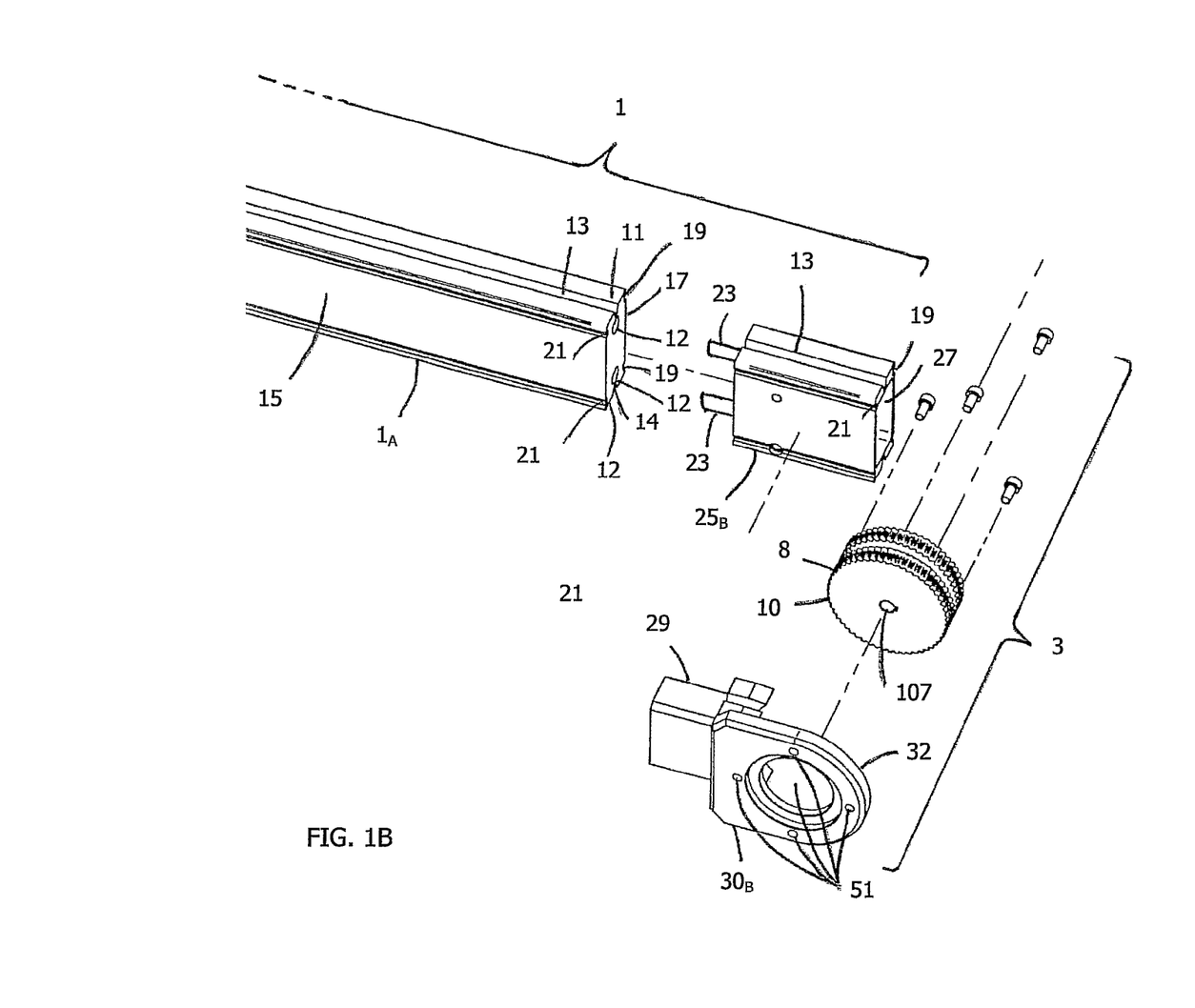
FIG. 1B is an exploded view of a second end of an example embodiment of a linear band guide device according to the present invention.
Figure 1C:
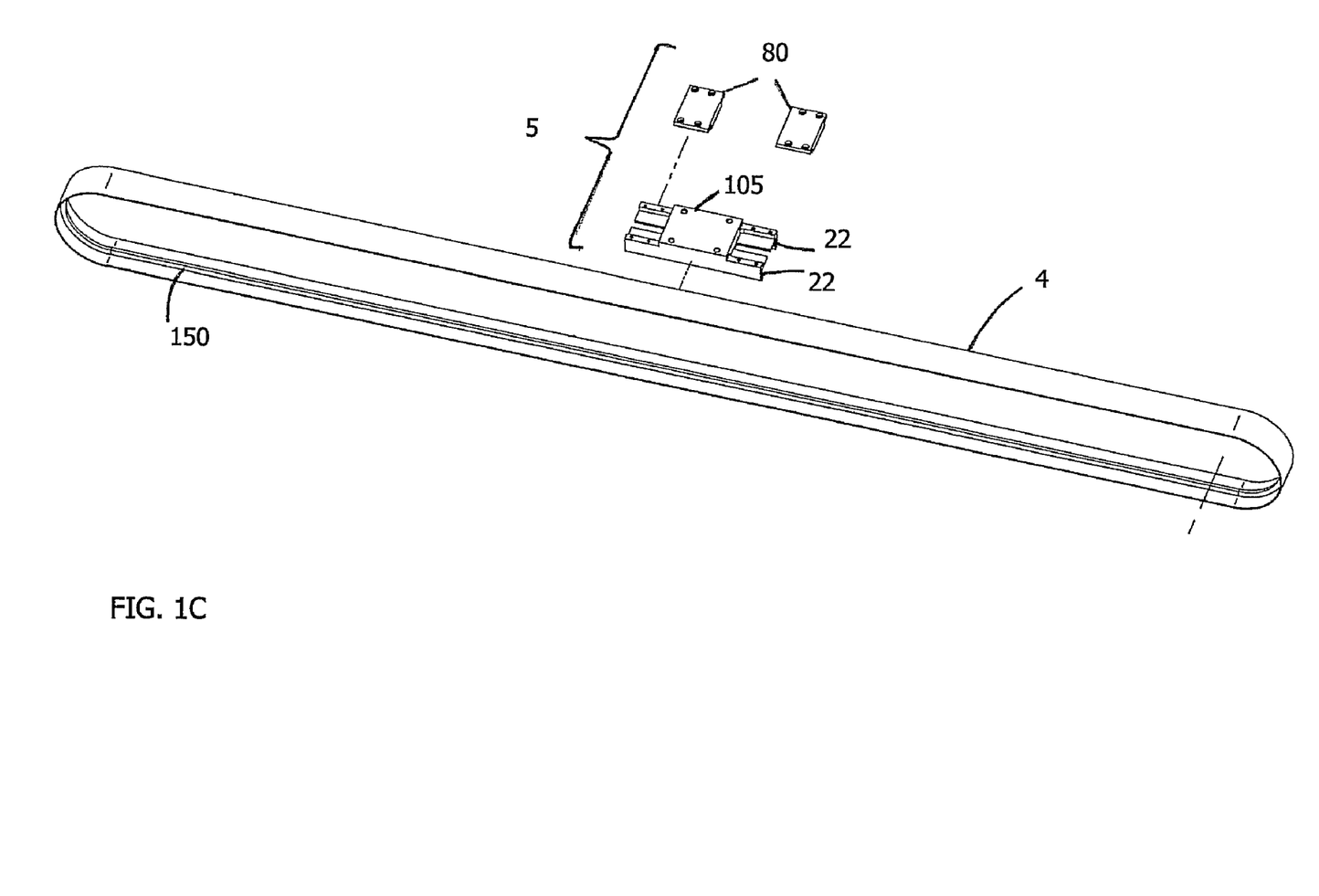
FIG. 1C illustrates a band as used with of the linear band guide device according the invention together with a slider or carriage unit which is used in some embodiments of the linear band guide device according to the invention.

The various aspects and embodiments of the present invention will now be described in more detail with reference to FIGS. 1-6. FIGS. 1A-C illustrates a linear band guide device for supporting and defining a path for a band according to the present invention.

As will be explained in more detail in the following the guide device according to this invention is a multipurpose device which can be applied as a basic structure for several related applications. The basic linear band guide device according to the present invention comprises an elongate band support structure 1, a first band end support 2 at a first end of said elongate band support structure 1, and a second band end support 3 at a second end of said elongate band support structure 1. The elongate band support structure 1 has a substantially flat top surface 11. The flat top surface 11 functions as a slide surface or bed for the band 4.

The said substantially flat top surface 11 of the elongate band support structure 1 is provided with band guiding means 13 in order that a band may be guided along a predetermined path along said beam top surface 11. This predetermined path may be a continuous loop or a limited part of a continuous loop, depending on the particular application and set-up.

The band guiding means 13 could be at least one groove or track formed in the top surface 11 of the band support structure 1. Typically, the groove will be oriented in the longitudinal direction of said elongate band support structure 1 and shaped to allocate a complementary longitudinally oriented protrusion of a band 4, e.g. in the form of a rib-like structure 150.

The elongate band support structure 1 will typically have a first side wall 15 and a second side wall 17. Each of the side walls 15,17 will be provided with guiding tracks 19,21 for guiding a slider 5 having complementary guiding tracks 22. The guiding tracks 19,21 in a wall 15,17 are preferably a pair of grooves 19,21 of substantially rectangular cross section. The pair of grooves 19,21 are preferably located near the top surface 11 of the elongate band support structure 1, near the bottom surface 12 of the elongate band support structure 1, or a combination of both. Preferably, the grooves 13,19,21 of the elongate band support structure 1 are designed so as to give a symmetrical cross section to the elongate band support structure 1. This way the band support structure 1 may be oriented the other way around, or upside-down without altering the general cross section.

The elongate band support structure 1 may be designed in three-part form, the first part being one or more centre elements $1_A$ connected together. Using the pairs of connecting elements 23, preferably in the form of pins, two centre elements $1_A$ may be connected together to provide a longer linear band guide of about twice the length of a single centre element. Further, virtually any number of centre elements $1_A$ may be connected together in the same manner to obtain a total length equal to any multiple of the length of a single elements $1_A$. Thus, the linear band guide according to the present invention is scaleable or reconfigurable, using an uncomplicated technique, to a number of different lengths, provided of course a band 4 of sufficient length is available.

The second part is a first connecting element $25_A$ located at a first end of a single centre element $1_A$ or at the end of a combination of several centre elements $1_A$ the connecting elements $1_A$ being used for connecting the centre element $1_A$ or a combination of centre elements $1_A$ to a first band end support 2. The third part is a second connecting element $25_B$ for connecting a single centre element $1_A$ or a combination of centre elements $1_A$ to a second band end support 3. Preferably, the first and second connection elements $25_A, 25_B$ are identical in form, and symmetric about both of two orthogonal planes which cuts the connection elements in two along a longitudinal axis which is parallel with a generally longitudinal direction of the band support structure. In this way, each of the connection elements $25_A, 25_B$ can be connected in two orientations at each end of said centre element $1_A$. Preferably, the centre element $1_A$ is made symmetric in the same manner as the connection element, allowing it to be oriented in a total of four possible orientations. This design makes it both faster and more convenient to assemble the linear band guide according to the invention. Further, the interchangeability of the connection elements $25_A, 25_B$ doesn't make it critical at which end of the centre element each connection element is connected.

Thus, each of the connection elements $25_A, 25_B$ have a similar mechanical interface at a first end to enable connection to either end of the centre element $1_A$. In addition, the connection elements $25_A, 25_B$ also have a similar mechanical interface at a second end for coupling with the band end supports 2,3, thereby allowing also the band end support element to be interchanged, and connected in at least two different orientations to a connection element $25_A, 25_B$.

Figure 2:
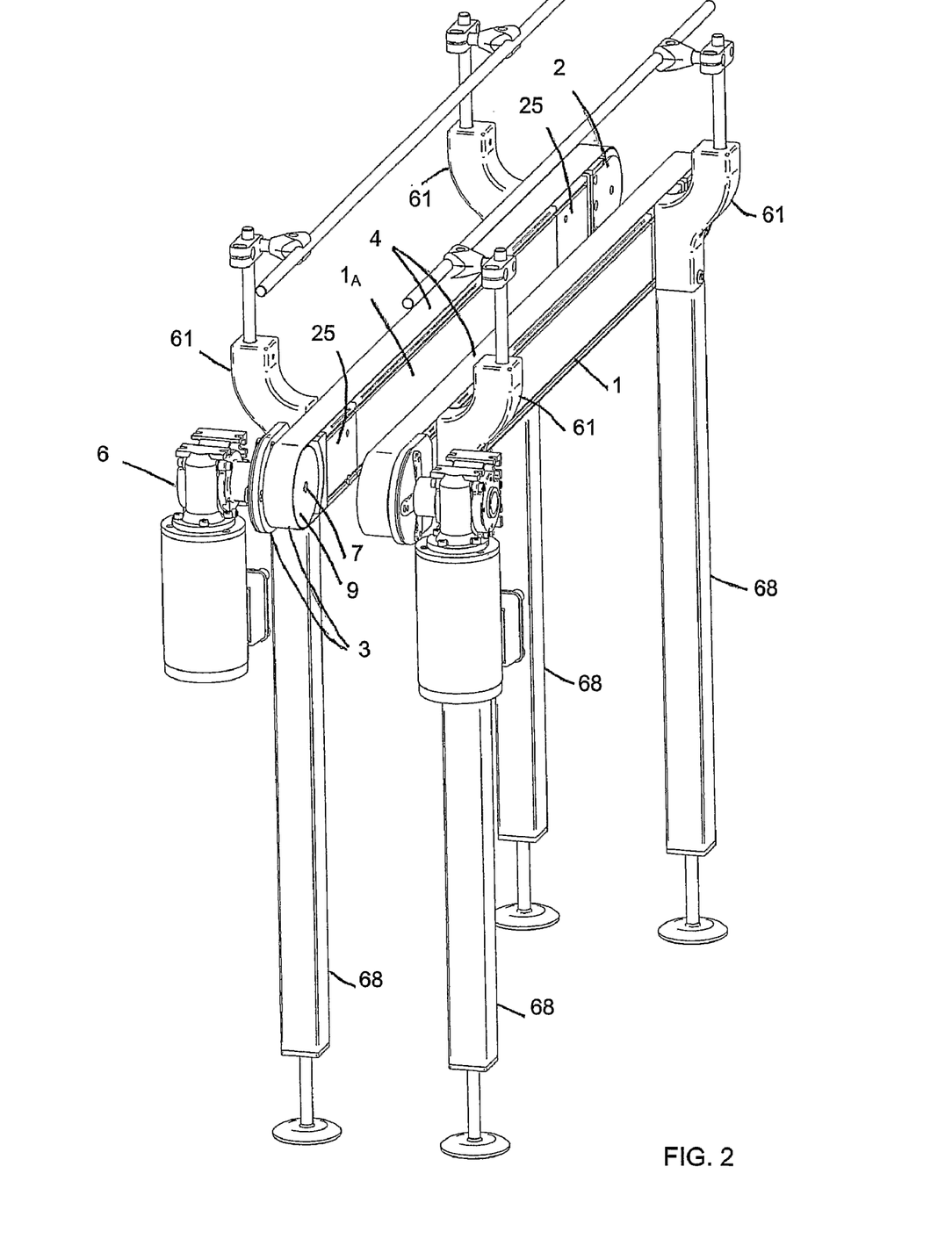
FIG. 2 illustrates an example embodiment of a narrow band conveyor according to the present invention incorporating a linear band guide with a band.

With reference to FIG. 2 there is shown two linear band guide device according to the present invention arranged in parallel in a conveyor type configuration. In each of the linear band guide devices a continuous band 4 is running in an endless elongate loop between a first band end support 2 and a second band end support 3 arranged at opposite ends of each elongate band support structure 1. Each elongate band support structure or rail 1 has a top surface 11 along which a band 4 may be longitudinally guided using band guiding means 13 in the form of a longitudinal groove in said top surface 11 into which a corresponding rib/protrusion 150 of the band 4 may be arranged so that the band 4 is guided along a predetermined path along top surface 11 of the rail. The beam 1 also has a first side wall 15 and a second side wall 17.

Each side wall 15,16 has guiding tracks 19,21 e.g. in the form of grooves 19,21. A carriage or slider 5 as illustrated in FIG. 1C is designed with complementary tracks 22 for cooperating with said grooves 19,21 in order to enable a sliding of the slider or carriage 5 along the elongate band support structure or rail 1.

In the configuration of the linear band guide shown in FIG. 2 the band may be driven continuously around the loop by the band drive unit 6 which is coupled to the second band end support 3, the second band end support 3 typically comprising a wheel, mounted on a central axle 7, said axle 7 coupling the wheel 10 to the band drive unit 6. The wheel of the second band end support 3 may be designed with a corrugated outer surface for providing sufficient friction with the band 4 to be able to drive the band 4 around its loop. The axle 7, which is mechanically coupled to the band drive unit 6 is arranged in an opening 51 of the band end support 2. The band drive unit 6 may for example be an AC three-phase motor or a servo motor, or any other electric motor which is known to a person of ordinary skill in the art, mechanically attached to a band end support main body $30_B$.

Even though FIG. 2 illustrates two bands 4 in a double rail type configuration, it should be understood that only one rail or more than two rails, could also be arranged to provide a conveyor. Such alternatives could be useful either when smaller or larger objects are to be moved along the rail 1. In FIG. 2 the bands 4 are driven by separate band drive units 6, however in applications with multiple rails 1 the bands 4 could be coupled to a common band drive unit 6.

A first band end support 2 has a first band turning device 9 around which said band 4 is arranged in order to turn the band from the other of said top 11 and bottom 12 surfaces. This first band turning device 9 could comprise a second cylindrical wheel or a cylinder shaped element produced from a material giving low friction with the band, preferably a polyethylene (PET) material, perhaps a HD100 type PET material.

A second band end support 3 comprises a second band turning device 10, preferably in the form of a cylindrical wheel having a central axial aperture 107, into which an axle may be arranged, perhaps the axle of a band drive unit 6. The band 4 is arranged at least partially around the wheel 10 in order to turn the band 4 from one of said top and bottom surfaces 11,12. In order to improve the driving of the band, the first band turning device may be provided with a corrugation 8 on its outer surface in order to obtain a significant amount of friction in contact with the band 4. This way, the band 4 will be driven around its loop when the band drive device 6 is running.

At least one of the first and second band turning devices 9,10 has band drive means 6 and band friction means, e.g. a corrugated surface 8, whereby the band drive means 6 may provide the band 4 with a longitudinal sliding movement along the top and bottom surfaces of said beam 1 and partially along cylindrical surfaces of the first and second band turning devices 2,3.

FIG. 1C further illustrates how a slider or carriage 5 may be mounted as a part of the linear guide according to the invention. The carriage 5 is attached to the band 4 in order that the carriage 5 may follow the movement of the band 4, following the activation of the band drive unit 6. The slider or carriage 5 may be attached to the band by first providing a single length of band with two ends, possibly by cutting a band shaped as a loop, then attaching the two ends of the single band length to opposite sides of the carriage using a band locking means. The band locking means could for example comprise two locking elements 80, one at each end of the carriage 5 where an end of a band may be placed between the main body 105 of the carriage and locking elements 80, whereby the end of the band will be locked following the locking of the locking elements 80. Closing may be achieved for example by fastening the locking elements 80 to the main body 105 of the carriage 5 using for example a screw arrangement.

Figure 4:
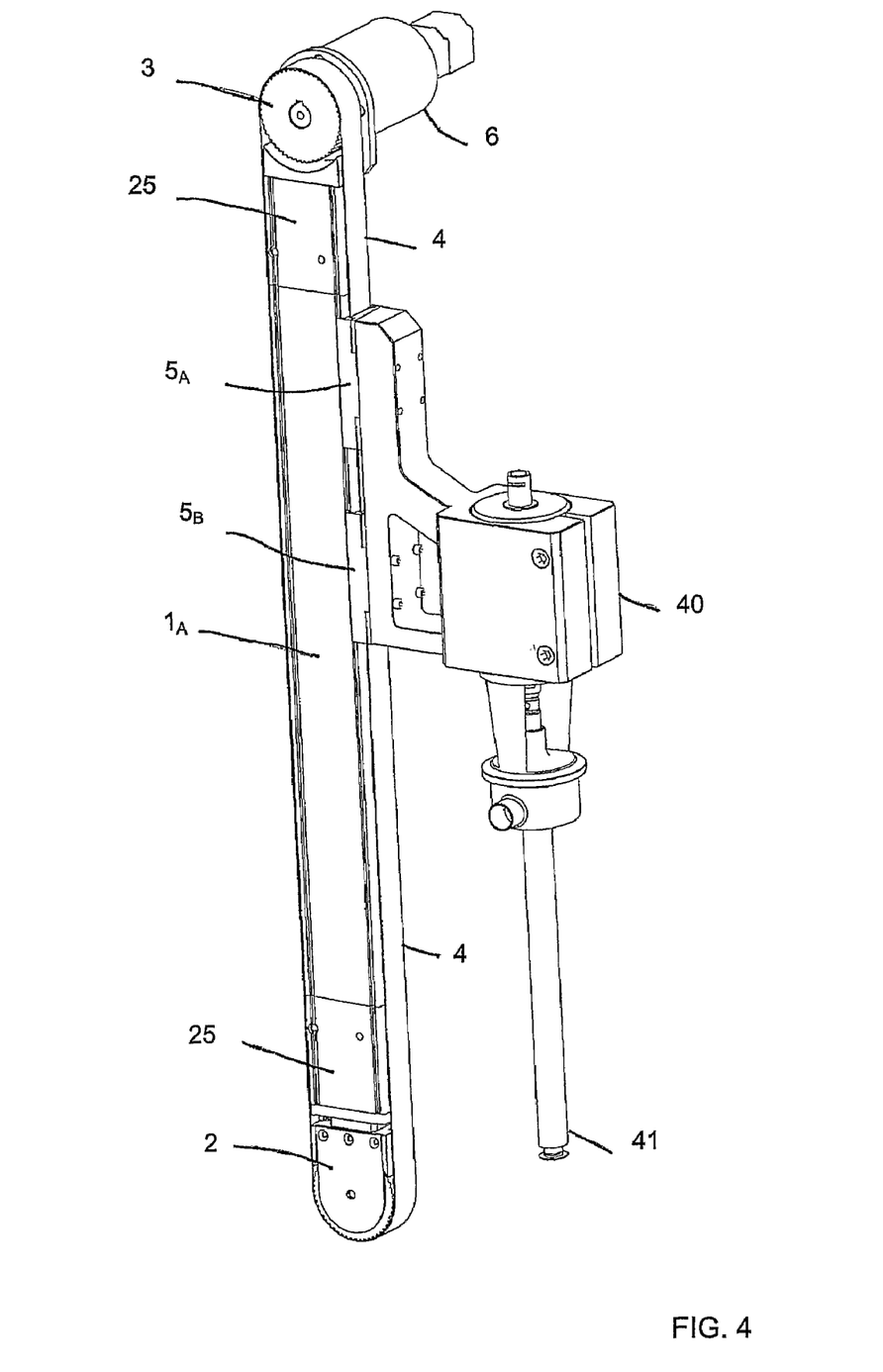
FIG. 4 illustrates an embodiment of the present invention in a vertical arrangement where the linear band guide device has a band and a twin-type carriage carrying an applicator device, e.g. for application of an adhesive.
Figure 5:
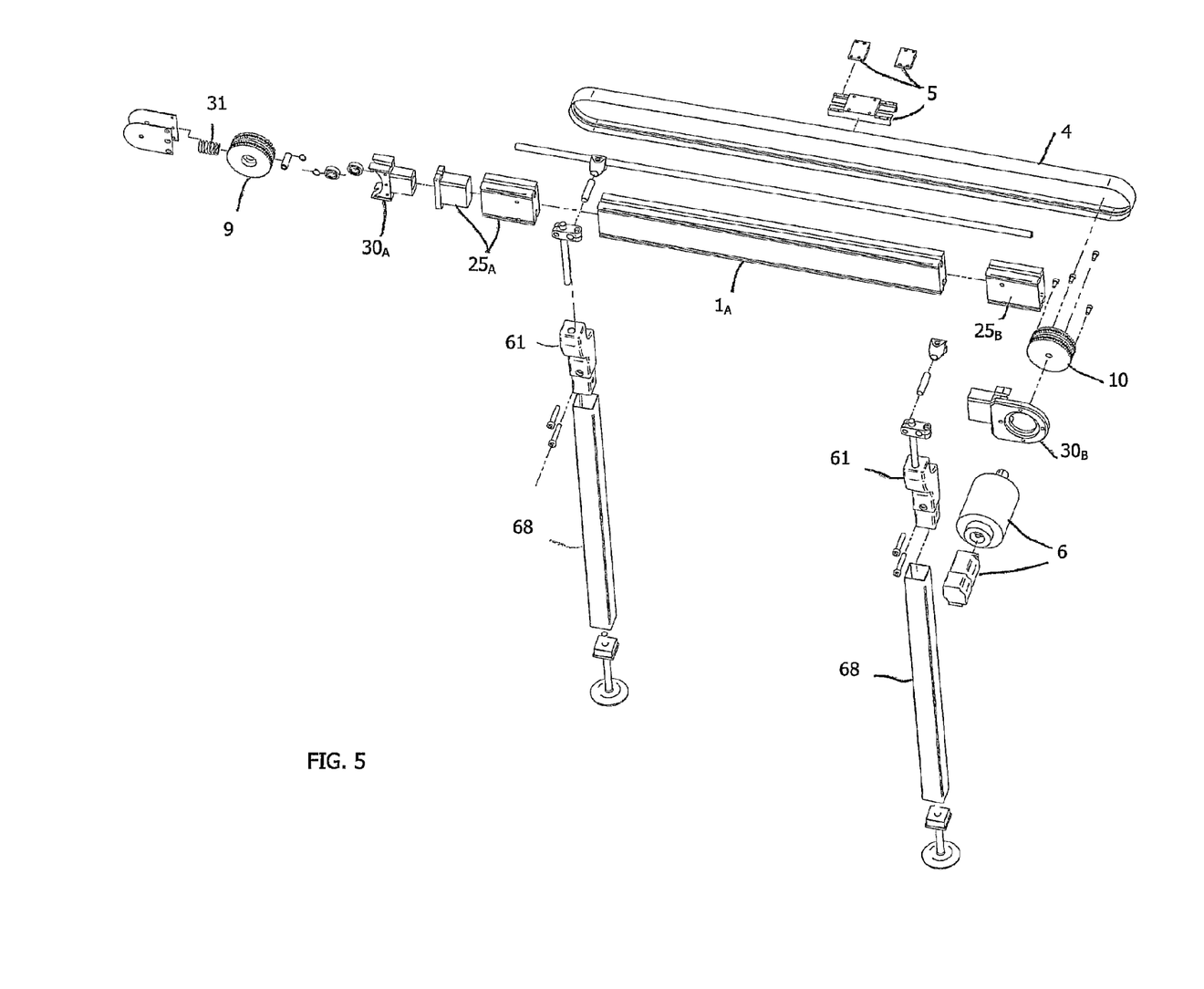
FIG. 5 is an exploded view illustrating the various parts of an example embodiment of a linear guide according to the present invention having a linear band guide, a band and a slider or carriage.

As an example, FIG. 4 illustrates an example application of the linear guide device according to the invention in which two carriages 5A,5B are arranged to carry a piece of equipment, in this case an applicator device 40. The diagram shows a vertical arrangement of a linear guide device according to the invention. Thereby a downwards movement of the applicator device 40 may be obtained, whereby the applicator tip 41 may contact an object in order to achieve some operation, for example the application of an adhesive, to a part of said object.

On the exploded view of FIG. 4 there is shown a linear guide according to the invention having a band support element 1, a band 4 and a slider or carriage 5 (as also illustrated on FIG. 1C) together with two associated support legs 68 and two auxiliary brackets 61 intermediate between the support element 1 and a support leg 68.

Each end of the centre element $1_A$ is provided with one or more cylindrical pin holes 12 with their axis aligned parallel with the longitudinal axis of the centre element $1_A$, as illustrated on FIGS. 1A-B. Into each of these cylindrical holes 12 connecting pins 23 may be placed for connecting a centre element $1_A$ with another similar centre element $1_A$ in a serial manner, for providing a long elongate band support structure 1, whereby a longer linear guide, a longer linear conveyor or a longer transport band may be realized. Connecting pins 23 are preferably a standard pin type, e.g. 12 mm diameter pins, typically produced in stainless steel.

An elongate band support structure 1 comprises connection elements $25_A, 25_B$ using the connection pins 23, said connection pins 23 being mounted with its first end into cylindrical holes 12 in the centre element $1_A$ and with its second end being mounted into corresponding cylindrical holes 12 in a connection element $25_A, 25_B$. On each connection element $25_A, 25_B$ there are provided grooves similar to and oriented so as to align with the grooves in the centre element $1_A$, in order that the grooves in the centre element $1_A$ and connection elements $25_A, 25_B$ form continuous grooves along the elongate band support structure or rail 1. The elongate band support structure 1 is typically provided with a hole 27 at each end, preferably as a part of each connection element $25_A, 25_B$. The hole(s) 27 may be designed as a part of the connection element $25_A, 25_B$ opposite to the end that is connected to the centre element $1_A$. The band end supports 2,3 illustrated on FIGS. 1A and 1B may then be provided with suitably shaped projecting members 29 which may be mounted into the hole 27 of the connection element 25. In the hole 27 of the connection element 25 a spring element 31 such as e.g. a metal coil could be placed so that the spring element 31 pushes the band end support 2 away from the connection element 25, thereby yielding some amount of resilience between the two band end supports 2,3. An adaptor unit $25_C$ may be used between the connection element $25_A$ and a band end support main body $30_A$ in the event that the protruding section 29 of the band end support main body $30_A$ does not fit directly to the connection element $25_A$.

FIG. 1A-B illustrates in detail how a part of a first band end support 2 is connected to one end of the elongate band support structure 1. At one end of the band end support 2 there is provided a connecting protrusion 29 designed to fit into a complementary hole 27 defined in a connection element 25. Outwardly from the elongate band support structure 1 the band end support 2 transitions from the protrusion 29 to a band end support main body $30_A$. At one end the band end support main body $30_A$ is designed to accommodate a band turning device 9 comprising a wheel. The band turning device 9 comprises two flat plates 160 separated by a space in which said wheel 9 is mounted. The wheel 9 is coupled to the flat plates 160 via an axle 161 an adaptor rings 162. The flat plates 160, which can be produced from stainless steel, are at one end fastened to the band end support main body $30_A$.

On FIG. 1A-B there is also shown in more detail how a band end support 3 couples a band drive unit 6 to the band 4 passing along the elongate band support structure 1. The band end support 3 is provided with a protrusion 29 designed to fit into a complementary hole 27 defined by a connection element 25, or alternatively into a complementary hole in an adaptor $25_C$ which has a protrusion fitting into the hole 27 of said connection element 25. When mounted in its normal position, and outwardly from the elongate band support structure 1, the support member 3 transitions from the protrusion 29 to a support member main body $30_B$ which then transitions to a band support member flat part 32, possibly via an adaptor $25_C$, the flat part being sideways translated with respect to a central longitudinal axis of the elongate band support structure 1 when the band end support 3 is connected to the elongate band support structure 1. The flat part 32 could be a metal part such as a flat stainless steel element fastened to the main body $30_B$ using some form of fastening means, e.g. a traditional screw arrangement. The flat part 32 comprises fastening means, for example suitable holes 51 for mounting and fastening a band drive unit 6. Typically, an axle 7 of the band drive unit 6 will be mounted so as to be coupled to the wheel 10 of the band end support 3, e.g. via a hole 51 defined in a part of the support member, and coupled to the band turning device 10, e.g. a wheel of the band end support 3. The wheel may be mounted on one side of a flat part 32 of the band end support 3 while the band drive unit 6 is connected to the opposite side, the band drive unit being 6 coupled to the band end support 3 via the axle 7 going though a central hole of said band end support 3.

Figure 3:
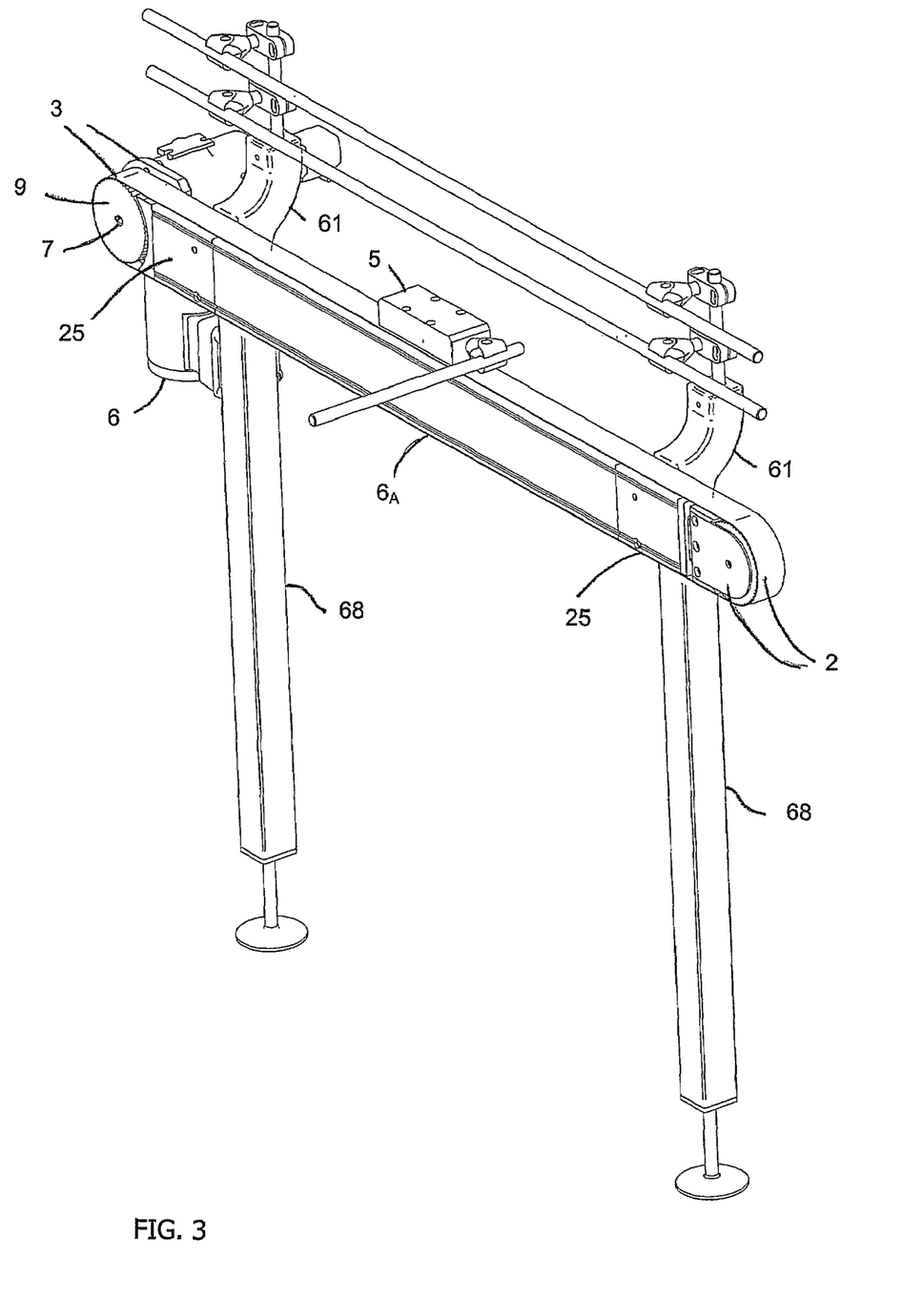
FIG. 3 illustrates an example embodiment of a linear guide according to the present invention having a linear band guide, a band and a slider or carriage.
Figure 6:
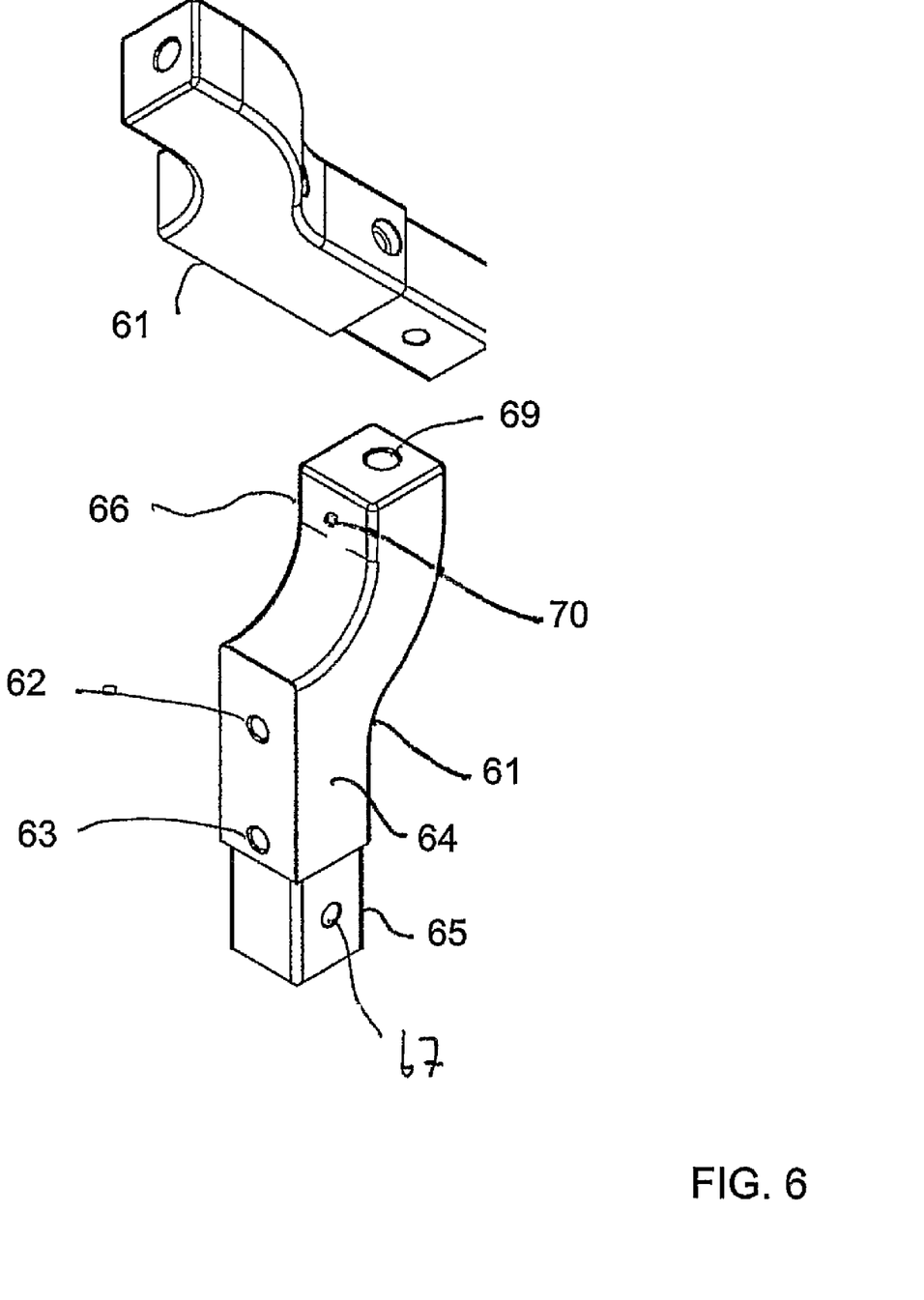
FIG. 6 illustrates an example of a combined auxiliary bracket used as a part of a linear guide device according to the present invention.

Further, a combined auxiliary bracket 61, as illustrated in detail on FIG. 6, may be fastened to the linear guide of the invention as illustrated on FIGS. 2 and 3, preferably onto the connection elements 25, for example using a traditional screw arrangement.

The auxiliary bracket 61 is attachable to the connection element 25 using for example threaded screws going through holes 62, 63 in the auxiliary bracket 61 and into a connection element 11.

The auxiliary bracket 61 has a generally elongated half-Y-like form and a square cross section. At a first (leg) end 65 the half-Y shaped bracket 61 provides for the mounting of a support leg mounting end of somewhat lower cross-section onto which, a support leg 68, for example designed to have a square cross section and open interior at one for being be mounted onto the leg end 65 of the bracket and fastened there, for example using a screw passing a side wall of the support leg 68 and entering a first bracket hole 67.

At a second (guide) end 66 the auxiliary bracket 61 extends to a position which will be next to the objects arranged on the band 4 when this is in operation. At his second end 66 the auxiliary bracket bends away from the band 4 in order to allow a larger free space for the objects on the band 4.

The combined leg bracket 61 comprises support details 69, 70 at the second end 66 of the auxiliary bracket 61 for allowing the mounting of a guide system having a number of interconnected cylindrical pins of a standard dimension into a guide pin support hole 69 and fastening of the guide pin using a tightening screw mounted in a tightening screw hole 70 in the second end 66 of the bracket 61. The hole 70 extends into the bracket 61 so far that it reaches the support hole 69 in order that a tightening screw may contact a guiding pin which has been inserted into the guide pin support hole 69.

Because the auxiliary brackets 61 at one end bend way from the elongate band support structure 1 to which they are attached, this allows objects having dimensions slightly or somewhat larger than the width of the band 4 to be placed onto the band while not being hindered by a guide arrangement attached to the auxiliary brackets 61.

Figure 7:
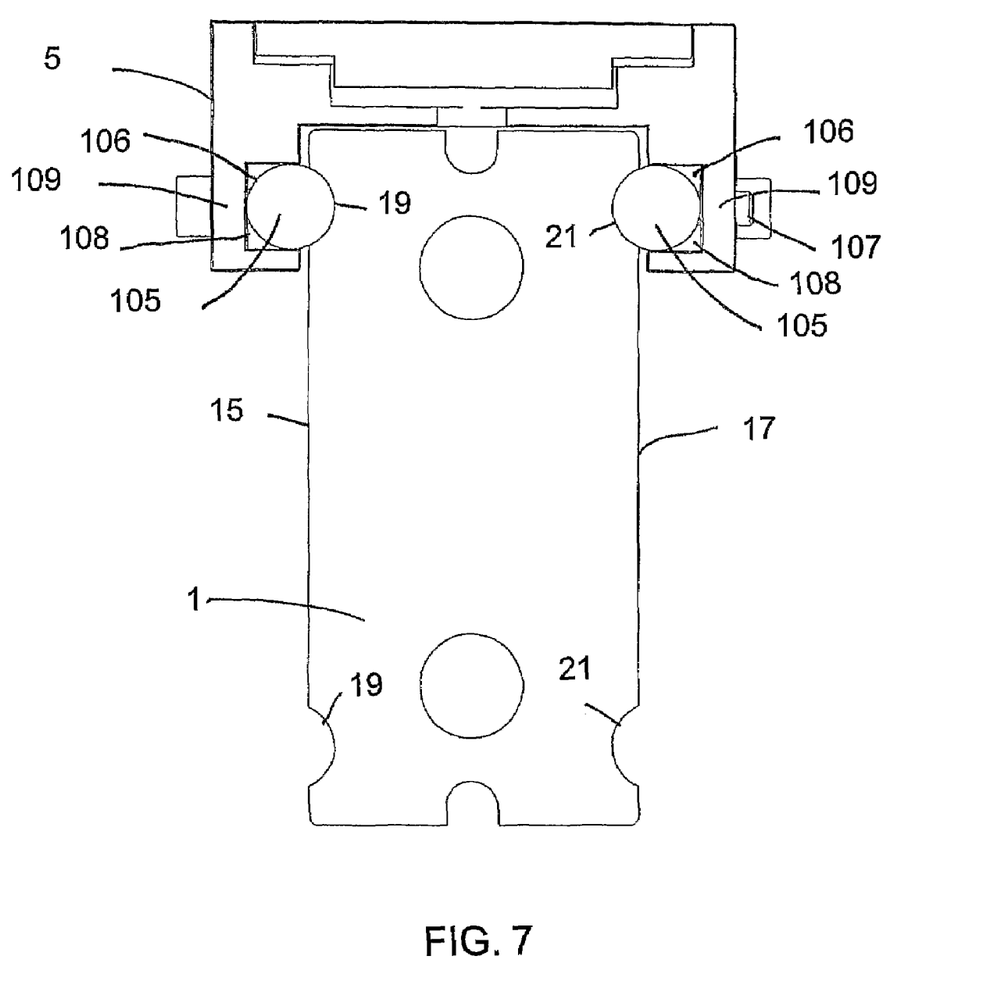
FIG. 7 illustrates a cross section of an example embodiment of the coupling of a slider or carriage to a linear band guide using substantially cylindrical elements as part of the coupling

FIG. 7 illustrates an alternative form of the slider or carriage 5 of the invention. In this example the guiding tracks of the slider 5 is defined by first hollow portions 106 in the inwardly directed surfaces 108 of skirt portions 109 of the carriage 5, said skirt portions 109 of the carriage extending along a part of the side walls 15, 17 of the support structure 1. The first hollow portions 106 (in the carriage 5) extend along a direction substantially parallel with the longitudinal direction of the band support structure 1, said hollow portions 106 allowing placement of an elongated, substantially cylindrically shaped intermediate element 105 between corresponding substantially cylindrically shaped second hollow portions 19, 21 in said band support structure 1 and the skirts 109 of the carriage or slider 5. The slider or carriage 5 may be equipped with a tightening screw 107, arranged for enabling tightening the coupling between said carriage 5 and said band support element 1. Preferably, the tightening screw is held in a threaded hole of the carriage, protruding towards the intermediate element 105, in order that the screw may be screwed to contact said element 105, causing the element 105 to push against the wall 17 of the band support element 1, thus tightening the coupling between the carriage 5 and the support element 1.

Preferably, as many parts as possible in the linear guide system according to the invention are made from a non-corrosive material, such as stainless steel or a similar material. Among the types of material to use in the various parts of the conveyor, two types are particularly useful.

The first type of material is a sufficiently corrosion resistant, non-absorptive rigid material to provide structural integrity, e.g. a food-grade stainless steel. Although this is a preferred material, this is not intended to exclude other materials of similar properties otherwise known to a person skilled in the art.

The other type of material is a low coefficient of sliding friction material, such as e.g. polyethylene, otherwise known as PET, preferably a ultra-high molecular weight (UHWM) polyethylene. PET type HD100 is one alternative, but this is not intended to exclude other materials of similar properties known to a person skilled in the art.

Advantageously, the linear guide device according to the present invention have very few parts, all parts are to large extent standardized, in order that the various parts may easily be replaced. As many parts as possible, for example the centre element $1_A$, are designed as symmetric structures in order that they may be turned between several orientations while maintaining its form. For example, such a design allows for interchange of the band end supports 2,3 whereby a band drive 6 may be connected at either end of the linear guide.

A linear guide device according to the present invention may be used in a number of configurations, as explained in the abovementioned examples. A linear guide may be assembled by connecting a number of similar centre elements $1_A$ together, thus enabling many different total lengths of the assembled linear guide.

The linear guide device according to the invention provides an open, rugged structure which is relatively easy to assemble and take apart as there are a minimum of screws or bolts used in the linear guide, most of the main elements are simply slotted into each other thereby enabling them to normally be easily pulled apart manually, for example for cleaning. The linear guide according to the invention can tolerate some exposure to dust, dirt or the like without risking complete clogging, and is therefore highly suitable for a number of rough environments, for example in applications handling foodstuff.

The linear guide operates without the use of roller bearings and avoids many of the typical limitations associated with roller bearing based devices.

The invention claimed is:

1. A linear band guide device for supporting and defining a path for a band, comprising:
   an elongate band support element, the band support element having a cross-section with a uniform outer shape,
   a first band end support at a first end of said elongate band support element,
   a second band end support at a second end of said elongate band support element, and
   said elongate band support element having a substantially flat top surface capable of functioning as a slide bed for the band, the elongate band support element comprising a first side wall and a second side wall, each of the said side walls having a guiding track for guiding a slider having complementary guiding tracks,
   the band support element and the band end supports adapted to alternatively support an endless band alone and a band including a slider,
   one of the first and second band end supports being connected to the band support element by a connecting element, the connecting element having a spring element acting on the band end support to bias the elongate band, the spring element being situated within the connecting element, the connecting element having a cross-section with the same outer shape as the band support element, and
   the connecting element being adapted to connect to the band support element in an end to end relationship so that the connecting element forms a continuous flush continuation of the outer shape of the support element, including the guiding tracks for the slider.

2. The linear band guide device according to claim 1, wherein the band support element has a symmetrical cross section.

3. The linear band guide device according to claim 1, wherein the first and second band end supports are interchangeable.

4. The linear band guide device according to claim 1, wherein said guiding track in a wall is a single groove of substantially rectangular cross section.

5. The linear band guide device according to claim 1, wherein said guiding track comprises a groove located near said top surface.

6. The linear band guide device according to claim 1, wherein said guiding track comprises a groove located near said bottom surface.

7. The linear band guide device according to claim 1, wherein the elongate band support element comprises a first side wall and a second side wall, each of the said side walls having a generally elongated, cylindrically formed guiding track for at least partly allocating a generally elongated, cylindrically formed element arranged in said support element guiding track for contacting complementary guiding tracks of a slider or carriage.

8. The linear band guide device according to claim 7, wherein a slider or carriage comprises a tightening screw, for tightening the coupling between said carriage and said band support element.

9. The linear band guide device according to claim 1, wherein the elongate band support element comprises one or more connected center elements, a first connecting element at a first end of said one or more connected center elements for connecting the center elements to said first band end support, and a second connecting element for connecting the center elements to said second band end support.

10. The linear band guide device according to claim 1, comprising a continuous band arranged to move in an endless elongate loop passing a first band end support and a second band end support arranged at opposite ends of the elongate band support structure.

11. The linear band guide device according to claim 10, comprising a slider or carriage attached to said band and guided in its movement by the tracks.

12. The linear band guide device according to claim 1, comprising one or more auxiliary brackets for allowing the mounting of the guide device onto a leg/support element and/or for supporting a guiding structure.

13. The linear band guide device according to claim 12, wherein each auxiliary bracket is fastened to a connecting element.

14. The linear band guide device according to claim 2, wherein the first and second band end supports are interchangeable.

15. The linear band guide device according to claim 2, wherein said guiding track in a wall is a single groove of substantially rectangular cross section.

16. The linear band guide device according to claim 3, wherein said guiding track in a wall is a single groove of substantially rectangular cross section.

17. The linear band guide device according to claim 14, wherein said guiding track in a wall is a single groove of substantially rectangular cross section.

18. The linear band guide device according to claim 2, wherein said guiding track comprises a groove located near said top surface.

19. The linear band guide device according to claim 3, wherein said guiding track comprises a groove located near said top surface.

20. The linear band guide device according to claim 4, wherein said guiding track comprises a groove located near said top surface.

* * * * *